United States Patent
Lund (10) Patent No.: US 8,115,596 B2
(45) Date of Patent: Feb. 14, 2012

(54) METHOD AND SYSTEM FOR CONTROLLING DISTANT EQUIPMENT

(75) Inventor: Arnaud Lund, Cagnes-sur-mer (FR)

(73) Assignee: International Business Machines Corporation, Armonk, NY (US)

( * ) Notice: Subject to any disclaimer, the term of this patent is extended or adjusted under 35 U.S.C. 154(b) by 1045 days.

(21) Appl. No.: 11/945,399

(22) Filed: Nov. 27, 2007

(65) Prior Publication Data

US 2008/0136640 A1 Jun. 12, 2008

(30) Foreign Application Priority Data

Dec. 7, 2006 (EP) .................................. 06301221

(51) Int. Cl.
*H04Q 5/22* (2006.01)
(52) U.S. Cl. ............... 340/10.1; 340/4.61; 340/4.11; 340/12.22; 340/572.1; 340/572.2; 340/572.3; 340/572.4; 340/572.5; 340/572.6; 340/572.7; 340/572.8; 340/572.9; 340/10.34; 340/10.4; 340/10.2; 340/10.3; 340/10.31; 340/10.32; 340/10.33; 340/10.41; 340/10.42; 340/10.5; 340/10.51; 340/10.52; 340/10.6
(58) Field of Classification Search ............. 340/825.72, 340/4.61, 4.11, 10.1–10.6, 12.22, 572.1–572.9, 340/815.6
See application file for complete search history.

(56) References Cited

U.S. PATENT DOCUMENTS

| | | | | |
|---|---|---|---|---|
| 5,341,426 A | * | 8/1994 | Barney et al. ................ | 713/171 |
| 5,388,211 A | * | 2/1995 | Hornbuckle ................. | 717/178 |
| 5,442,706 A | * | 8/1995 | Kung ............................ | 380/30 |
| 5,513,263 A | * | 4/1996 | White et al. ................... | 380/44 |
| 5,995,623 A | * | 11/1999 | Kawano et al. ............... | 713/189 |
| 6,078,888 A | * | 6/2000 | Johnson, Jr. .................. | 705/50 |
| 6,233,340 B1 | * | 5/2001 | Sandru .......................... | 380/51 |

(Continued)

FOREIGN PATENT DOCUMENTS

JP 60263544 A * 12/1985

(Continued)

OTHER PUBLICATIONS

Weis, Stephen A. et al.; "Security and Privacy Aspects of Low-Cost Radio Frequency Identification Systems"; Lecture Notes in Computer Science, Springer Verlag, Berlin, DE, vol. 2802, Jan. 27, 2004; pp. 201-212, XP-002397694.

*Primary Examiner* — George Bugg
*Assistant Examiner* — Paul Obiniyi
(74) *Attorney, Agent, or Firm* — Schmeiser, Olsen & Watts;; John Pivnichny (57) ABSTRACT

A method and system for controlling distant equipment. A passive radio frequency identification (RFID) tag within a Programmable Secure Remote Controller (PSRC) receives a radio frequency (RF) signal from a transmitter integrated in the distant equipment. The distant equipment is external to and remote from the PSRC. The PRSC does not include an internal source of energy and requires energy from an external source to operate. The PSRC is configured to distribute sufficient energy from the RF signal to components of the PSRC to enable the components to operate. The RFID tag is activated to generate information and the information is decoded to identify the distant equipment. A request to perform an operation that controls the distant equipment is received. After the request is received, a first predefined scenario is activated for performing the operation that controls the distant equipment.

14 Claims, 3 Drawing Sheets

U.S. PATENT DOCUMENTS

| | | | | |
|---|---|---|---|---|
| 6,272,635 B1* | 8/2001 | Saito | | 713/176 |
| 6,320,597 B1* | 11/2001 | Ieperen | | 345/629 |
| 6,401,201 B2* | 6/2002 | Fish et al. | | 713/2 |
| 6,424,947 B1* | 7/2002 | Tsuria et al. | | 705/1.1 |
| 6,531,964 B1* | 3/2003 | Loving | | 340/825.72 |
| 6,720,936 B1* | 4/2004 | Koolish et al. | | 343/910 |
| 6,995,652 B2* | 2/2006 | Carrender et al. | | 340/5.61 |
| 7,042,342 B2* | 5/2006 | Luo et al. | | 340/426.17 |
| 7,116,229 B1* | 10/2006 | Miramontes | | 340/572.1 |
| 7,120,250 B2* | 10/2006 | Candelore | | 380/200 |
| 7,154,924 B2* | 12/2006 | Sanchez | | 372/29.02 |
| 7,231,041 B2* | 6/2007 | Forest et al. | | 380/44 |
| 7,250,695 B2* | 7/2007 | Connors et al. | | 307/117 |
| 7,281,132 B2* | 10/2007 | Bender et al. | | 713/172 |
| 7,283,036 B2* | 10/2007 | Chen | | 340/10.34 |
| 7,286,747 B1* | 10/2007 | Lewis et al. | | 386/282 |
| 7,639,804 B2* | 12/2009 | Candelore et al. | | 380/200 |
| 7,675,935 B2* | 3/2010 | Samudrala et al. | | 370/466 |
| 7,689,198 B2* | 3/2010 | Deng et al. | | 455/345 |
| 2002/0019943 A1* | 2/2002 | Cho et al. | | 713/200 |
| 2002/0025044 A1* | 2/2002 | Saito | | 380/278 |
| 2002/0097165 A1* | 7/2002 | Hulme | | 340/825.72 |
| 2002/0141588 A1* | 10/2002 | Rollins | | 380/277 |
| 2003/0076968 A1* | 4/2003 | Rast | | 381/124 |
| 2003/0093752 A1* | 5/2003 | Chen | | 714/781 |
| 2003/0110382 A1* | 6/2003 | Leporini et al. | | 713/172 |
| 2003/0216228 A1* | 11/2003 | Rast | | 482/84 |
| 2004/0045587 A1* | 3/2004 | Franco et al. | | 134/18 |
| 2004/0049694 A1* | 3/2004 | Candelore | | 713/200 |
| 2004/0070491 A1* | 4/2004 | Huang et al. | | 340/10.5 |
| 2004/0075534 A1 | 4/2004 | Pierce et al. | | |
| 2004/0196979 A1* | 10/2004 | Cheng et al. | | 380/270 |
| 2004/0232220 A1 | 11/2004 | Beenau et al. | | |
| 2005/0093374 A1* | 5/2005 | Connors et al. | | 307/126 |
| 2005/0192904 A1* | 9/2005 | Candelore | | 705/51 |
| 2006/0061482 A1 | 3/2006 | Monney et al. | | |
| 2006/0125968 A1* | 6/2006 | Yokozawa et al. | | 348/734 |
| 2006/0267737 A1* | 11/2006 | Colby | | 340/10.51 |
| 2006/0288293 A1* | 12/2006 | Karasawa et al. | | 715/730 |
| 2007/0016768 A1* | 1/2007 | Sonnekalb | | 713/160 |
| 2007/0115940 A1* | 5/2007 | Kamen et al. | | 370/352 |
| 2007/0270672 A1* | 11/2007 | Hayter | | 600/309 |
| 2007/0280144 A1* | 12/2007 | Hodson et al. | | 370/312 |
| 2007/0280287 A1* | 12/2007 | Samudrala et al. | | 370/466 |
| 2008/0256368 A1* | 10/2008 | Ross et al. | | 713/193 |
| 2009/0037904 A1* | 2/2009 | Cohen et al. | | 717/175 |
| 2009/0094597 A1* | 4/2009 | Moskalik et al. | | 717/174 |
| 2010/0135486 A1* | 6/2010 | Schneider | | 380/46 |
| 2011/0016311 A1* | 1/2011 | Durand et al. | | 713/155 |

FOREIGN PATENT DOCUMENTS

| | | |
|---|---|---|
| WO | WO0245441 A1 | 6/2002 |
| WO | WO02084991 A2 | 10/2002 |

* cited by examiner

METHOD AND SYSTEM FOR CONTROLLING DISTANT EQUIPMENT

FIELD OF THE INVENTION

The present invention provides a method and system for controlling distant equipment.

BACKGROUND OF THE INVENTION

Industries use high technology remote controllers, particularly the industries having the need to control distant equipment like robotics, mechatronics, automotive, numeric systems, camera, VCR, sound system or television and any other electronic devices that need specific commands to operate. The remote controllers send data messages to the distant electronic equipment to initiate actions. However, the remote controllers have power demands which limit the size of those remote controllers.

There is a need for a remote controller whose power demands are satisfied in a manner that does not limit the size of the remote controller.

SUMMARY OF THE INVENTION

The present invention provides a method for controlling distant equipment, said method comprising:

receiving, by a passive radio frequency identification (RFID) tag comprised by a Programmable Secure Remote Controller (PSRC), radio frequency (RF) signals from a transmitter integrated in the distant equipment, said distant equipment being external to and remote from the PSRC, said PRSC not comprising an internal source of energy and requiring energy from a source external to the PSRC in order to operate, said PSRC configured to distribute sufficient energy from the RF signals to components of the PSRC to enable the components to operate, said components comprising the RFID tag;

responsive to said receiving the RF signal, activating the RFID tag to generate information indicative of the distant equipment;

decoding the information generated by the RFID tag, said decoding the information identifying the distant equipment;

receiving a request to perform an operation that controls the distant equipment;

after said receiving the request, activating a first predefined scenario for performing the operation that controls the distant equipment, wherein said activating the RFID tag, said decoding the information, said receiving the request, and said activating the first predefined scenario are performed by the PSRC.

The present invention provides a program storage device readable by machine, said program storage device tangibly storing a program of instructions executable by the machine to perform a method for controlling distant equipment, said machine being a Programmable Secure Remote Controller (PSRC), said method comprising:

receiving, by a passive radio frequency identification (RFID) tag comprised by the PSRC, radio frequency (RF) signals from a transmitter integrated in the distant equipment, said distant equipment being external to and remote from the PSRC, said PRSC not comprising an internal source of energy and requiring energy from a source external to the PSRC in order to operate, said PSRC configured to distribute sufficient energy from the RF signals to components of the PSRC to enable the components to operate, said components comprising the RFID tag;

responsive to said receiving the RF signal, activating the RFID tag to generate information indicative of the distant equipment;

decoding the information generated by the RFID tag, said decoding the information identifying the distant equipment;

receiving a request to perform an operation that controls the distant equipment;

after said receiving the request, activating a first predefined scenario for performing the operation that controls the distant equipment, wherein said activating the RFID tag, said decoding the information, said receiving the request, and said activating the first predefined scenario are performed by the PSRC.

The present invention provides a system comprising a Programmable Secure Remote Controller (PSRC), said PSRC comprising a program storage device tangibly storing a program of instructions executable by the PSRC to perform a method for controlling distant equipment, said method comprising:

receiving, by a passive radio frequency identification (RFID) tag comprised by the PSRC, radio frequency (RF) signals from a transmitter integrated in the distant equipment, said distant equipment being external to and remote from the PSRC, said PRSC not comprising an internal source of energy and requiring energy from a source external to the PSRC in order to operate, said PSRC configured to distribute sufficient energy from the RF signals to components of the PSRC to enable the components to operate, said components comprising the RFID tag;

responsive to said receiving the RF signal, activating the RFID tag to generate information indicative of the distant equipment;

decoding the information generated by the RFID tag, said decoding the information identifying the distant equipment;

receiving a request to perform an operation that controls the distant equipment;

after said receiving the request, activating a first predefined scenario for performing the operation that controls the distant equipment, wherein said activating the RFID tag, said decoding the information, said receiving the request, and said activating the first predefined scenario are performed by the PSRC.

The present invention provides a remote controller whose power demands are satisfied in a manner that does not limit the size of the remote controller.

DETAILED DESCRIPTION OF THE INVENTION

The present invention provides a secure remote control unit based on Radio Frequency IDentification (RFID) technology. The basic concept of RFID comprises identifying and tracking devices for system management purposes, using devices called RFID tags or transponders. The RFID tag picks up signals from and sends signals to a reader machine. The RFID tag contains a unique serial number that identifies the device handling the RFID tag but may have additional information, such as for example a customers' account number. The RFID tag may come in many forms, such as a smart label that can have a barcode printed on it. Beyond the common application of tracking, the use of RFID by the present invention is suitable for high technology wireless electronic systems based on message identification. Those wireless systems allow a readable machine to pick up messages stored on the tag device. The readable machine reads the notification message, identifies distant equipment and then an action which is indicated in the stored message is initiated. Bursts of electromagnetic waves are sent from the distant device located in a limited vicinity of the RFID component in order to power the RFID component. The RFID device replies to the incoming signals by providing the necessary information about its identity. In this RFID use, the readable machine operates like a remote controller of a mobile device on which is attached a RFID tag. However, as it will be detailed herein below, this operational mode is reversed in the invention, which reverse mode was not obvious to determine for implementation in a remote controller.

Thus, the present invention provides a compact energy-less programmable apparatus, herein named Programmable Secure Remote Controller (PSRC) to operate distant equipment located in a limited vicinity from the PSRC. By being energy-less, the PRSC does not comprise an internal source of energy or power and therefore must receive energy or power from an energy source or power source external to the PSRC in order for the PSRC to operate and perform its functionality. By using in an innovative manner some of the RFID principles, the Programmable Secure Remote Controller allows transmission of a user's selection after a decision-making identification process is performed.

The decision-making identification program may comprise a large variety of predefined scenarios to deal successfully with the distant equipment that needs to be controlled. The predefined scenarios specify how the distant equipment is to be controlled.

The predefined scenarios are set up during a chip design configuration phase of the PSRC and depend on an application domain where the remote controller is to be used. Moreover, for security purposes, the predefined scenarios may be encrypted into an identification memory during the chip design configuration phase of the PSRC. The identification memory that interacts with a RFID tag device may be a non-volatile memory such as a Read Only Memory or a Flash Memory (which can be easily updated in case of necessity).

A sensitive board included in the remote controller allows a user selection of a desired predefined scenario for controlling the distant equipment. The sensitive board may contain a matrix of functional key strokes (via buttons) allowing a user to select an action for selecting a predefined scenario, by hitting the button(s) associated with the functional key strokes.

Before granting a requested selection of a desired predefined scenario, several identification routines are run at the remote controller side to check the validity of the transaction by identifying the user. Once identified, the user selects the intended action (e.g., a selected predefined scenario) by hitting (i.e., striking) the appropriate button or sequence of buttons.

The remote controller associates one dedicated action (i.e., one of the predefined scenarios) to a button selection or to a sequence of buttons selection, and the associated predefined scenario is stored in the internal memory of the remote controller which is operated in response to the button selection or to the sequence of buttons selection.

As mentioned supra, the remote controller of the present invention is based on the RFID technology. However, contrary to the known use of RFID tags, the RFID tags of the present invention are included in the remote controller while the electromagnetic beam transmitter is included in the distant equipment that needs to be managed. Such reverse mode allows the remote controller to be energy-less in contrast to the usual RFID devices. Moreover, such arrangement offers the real advantage of a reduced implementation on a small card format like a credit card which results in a real cost manufacturing reduction.

The present invention has several extended applications. For example, the present invention may be adapted to cash machines. A user may directly enter the user's pin code on the credit card without inserting the credit card in any device and then the card transaction may be granted in a secure and confidential mode.

Thus, the present invention provides a remote controller, a program storage device readable by a machine, tangibly embodying a program of instructions executable by the machine to perform method steps for remotely controlling distant equipment, said method comprising: detecting the reception of a RF signal from distant equipment; upon reception of the RF signal, activating a RFID tag to generate information indicative of the distant equipment; decoding the information generated by the RFID tag for identifying the distant equipment; and activating a remote control process for controlling the distant equipment.

The Programmable Secure Remote Controller (PSRC) based on RFID technology is provided by the present invention. The transmission of a user's action selection is performed using a compact energy-less and contact-less mechanism associated to a decision-making identification process. The present invention may be used in various industrial and/or banking areas.

The PSRC contains one or more RFID tag devices depending on the functions implemented within the remote controller. The RFID tag device receives the electromagnetic beam from the transmitter that is integrated in the equipment that needs to be controlled.

In an implementation, the disclosed RFID system is fully compliant with the EPCglobal Network convention and application guidelines that use the "ISO15693", the "ISO18000" and the anti-collision protocols. The EPCglobal Network provides the conventions about the EPC (Electronic Product Code) arrangement, the ID System (EPC tags and Reader), the Object Name Services (ONS), the Physical Markup Language (PML) and finally the Savant that represents the engine of the data management based on software technology.

Even if some solutions can be integrated by using a wide variety of different RFID standards, an implementation of the present invention is based on using passive RFID tags that do not need battery powering. In addition, the data treatment and speed transmission do not require fast-growing data performance to achieve a sufficient read range in a limited radius.

Figure 1:
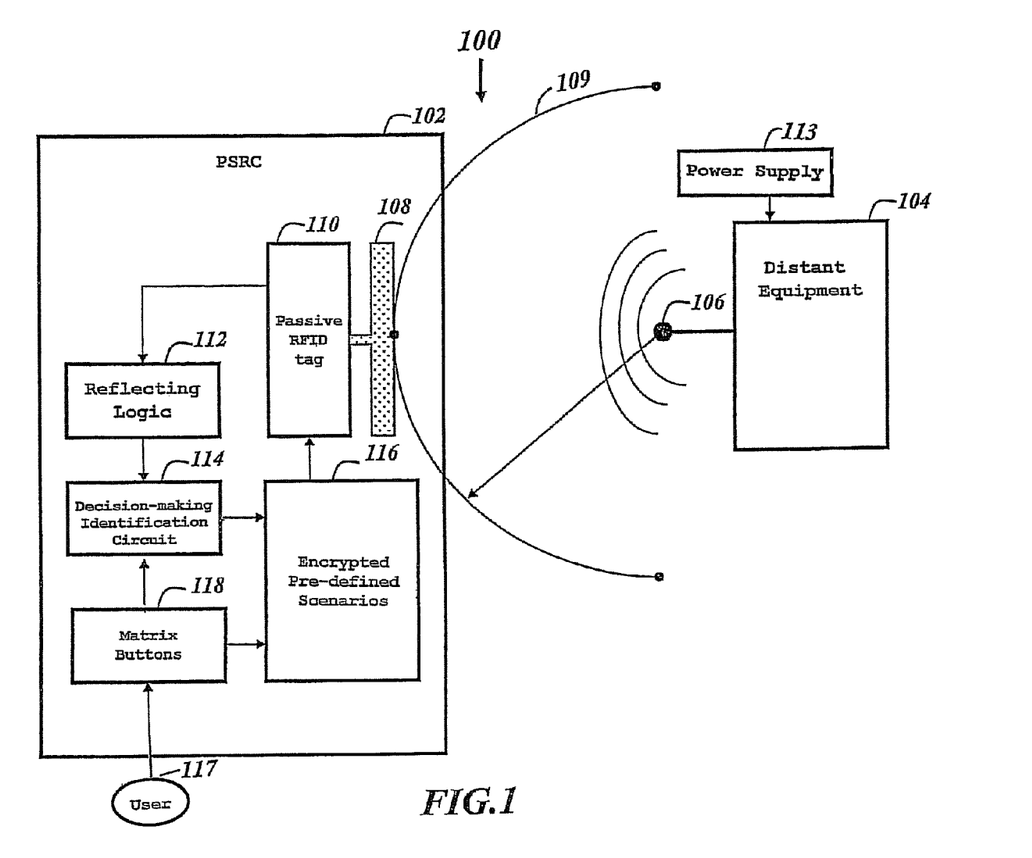
FIG. 1 is a block diagram of a system that comprises a Programmable Secure Remote Controller (PSRC) and distant equipment to be operated, in accordance with embodiments of the present invention.

FIG. 1 is a block diagram of a system 100 that comprises a Programmable Secure Remote Controller (PSRC) 102 and distant equipment 104 to be operated, in accordance with embodiments of the present invention. Once powered, via a power supply 113 input, the distant equipment 104 transmits an electromagnetic beam 106 to drive an antenna 108 located on the PSRC 102, wherein the PSRC 102 is located within a limited radius represented by circle arc 109 of the remote equipment 104. The electromagnetic beam 106 comprises a radio frequency (RF) signal whose energy powers a passive RFID tag 110, and a resultant energy allows a reflecting logic 112 to be sufficiently self-powered for the whole data transfer. A decision-making identification circuit 114 coupled to the reflecting logic 112 initiates one or several built-in encrypted predefined scenarios 116. The remote controller further includes a matrix of push buttons 118 to enable a user 117 to enter the appropriate selection to operate the distant equipment 104. The electromagnetic beam 106 from the distant equipment 104 powers all components within the PSCR 102 that require power to operate. Thus the PSRC 102 is configured to distribute sufficient energy from the RF signal to the components in the PSRC 102 to enable the componente to operate in accordance with the energy requirements of the components in the PSRC 102.

Upon reception of the RF signal by the PSRC 102, the RFID tag 110 is activated to generate information indicative of the distant equipment 104. The information generated by the RFID tag 110 is then decoded to identify the distant equipment 104. After the RFID tag 110 is decoded, a remote control process for controlling the distant equipment 104 is activated. The remote control process may pertain to a user-selected scenario of the predefined scenarios 116 such that the user-selected scenario specifies how the remote control process is to be performed. The PSRC 102 receives a selection by the user 117 of the predefined scenario from a memory 224 of the PSRC 102 (see FIG. 2) for controlling the distant equipment 104 by the remote control process. The memory 224 may comprise a program storage device tangibly storing a program of instructions executable by the PSRC102 to perform the methods of the present invention for controlling distant equipment 104 by the PSRC 102.

Figure 2:
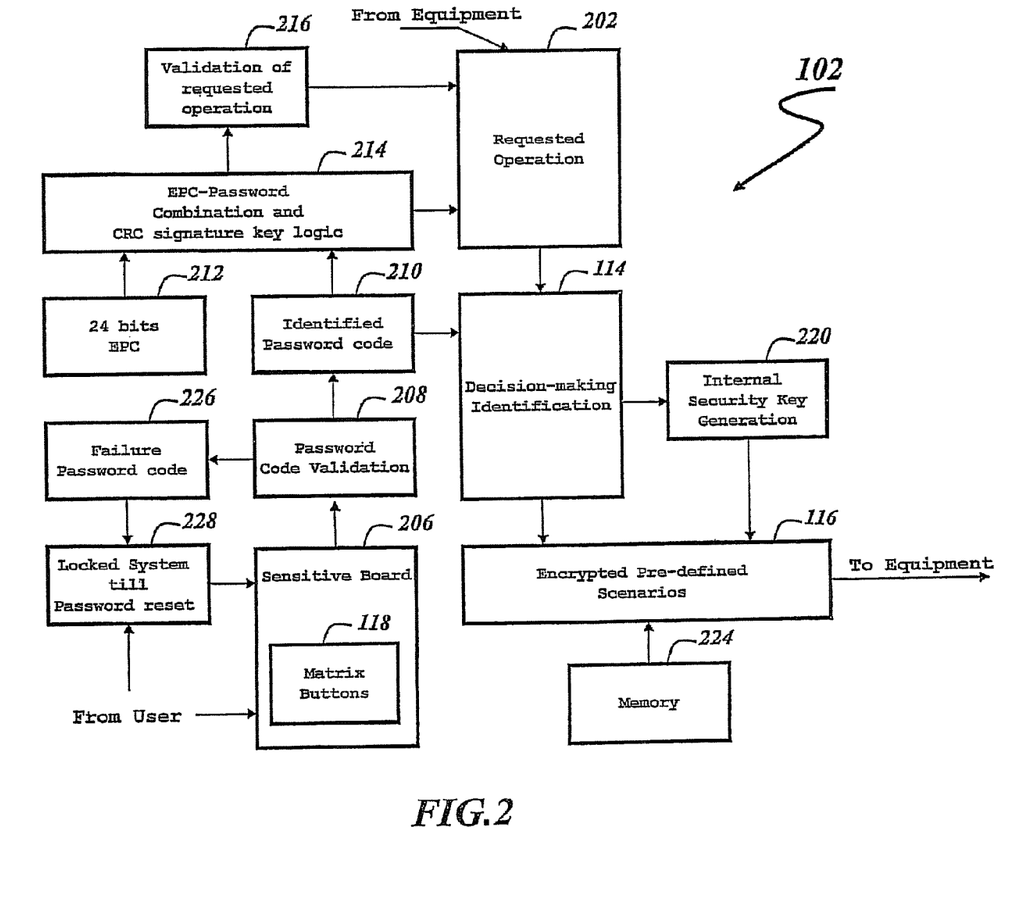
FIG. 2 is a logical diagram of operations to manage operation of the PSRC of FIG. 1, in accordance with embodiments of the present invention.

FIG. 2 is a logical diagram of operations to manage operation of the PSRC 102 of FIG. 1, in accordance with embodiments of the present invention.

The process starts when an energy flow (issued from the RFID tag 110) initiates a request 202 to perform an operation that controls the device or remote equipment 104. The request 202 needs to be granted by the reflecting logic 112. The reflecting logic 112 represents the RFID tag 110 identity that needs to be detected and identified by the distant equipment 104. The tag identification conforms to the Electronic Product Code (EPC Global) standard. The tag identity is generally a concatenation of several fields that provide the content of a message header (Version 8 bits), the EPC Manager (Manufacturer 28 bits), the Object Class (Product 24 bits) and the Serial Number (Serial Number 24 bits). In order to be fully decoded by the distant equipment 104, the decision-making identification function 114 identifies the user 117 by validating a password code via a password code validation block function 208. The password code is typed by the user 117 via matrix buttons 118 located on a sensitive board 206. The user 117 is then identified as being authorized via an identified password code block function 210.

The combination of the identified password code block function 210 with the 24 bits Electronic Product Code (EPC) 212 allows the PSRC 102 to operate in a flexible secure protocol by having the possibility to use multiple user passwords. EPC usually provides a unique key and content for a tag. Such arrangement of a combination 214 combines the 24 bits serial number code of the EPC (16 million combinations) with the identified password code 210 in accordance with on a Cyclic Redundancy Checks (CRC) signature key logic, which. allows the PSRC 102 to be handled by various authorized user groups and/or service providers that want to access to the distant equipment 104.

The validation of the password and the user identification in block 216 enables the validation of the requested operation 202 via a requested operation validation block function.

The decision-making identification block 114 generates an internal security key in block 220 to decode the corresponding predefined scenarios 116 (i.e., decrypt the encrypted predefined scenarios), wherein the internal security key is encrypted in block 212. The encrypted predefined scenarios are stored in a memory 224.

The encrypted predefined scenarios 116 are encrypted for security reasons and need to be decoded before transmission. According to the user application, several decryption algorithms are stored in the memory 224 for decrypting the encrypted predefined scenarios 116.

For example, when using the PSRC 102 in a TV set application, the decryption algorithm checks that the desired channel of the TV is authorized to be watched by young people. Other applications may be to use the PSRC 102 to monitor the setting of a coherency VCR recording sequence in terms of date, duration, tape free space, and so on.

Once the identified password code 210 is determined to be correct and the encrypted predefined scenarios 116 are decoded by the adequate security key, then the requested operation 202 is granted and the data messages of the user 117 are transferred from the PSRC 102 to the distant equipment 104.

If the requested operation 202 is validated, the user 117 can activate various operations by using the matrix buttons 118 located on the sensitive board 206 without typing the user's password again, such as for example, a TV user desiring to change the current TV channel to another one.

If the password code validation 208 block detects individual swindling or unauthorized accessing, like a password failure or an equipment aggression or a system violation, the failure password code block 226 locks and inhibits the PSRC 102 via a "Locked System till Password reset" block 228 as long as the undesirable situation persists.

A recovery password reset is necessary to reset the PSRC 102. The recovery password reset may be applied by security people in charge of restoring the PSRC 102 via the logic chain comprising matrix buttons 118, the sensitive board 206, the password code validation 208 and the identified password code 210.

An additional security function is to authorize the massive destruction of the PSRC 102, via the RFID tag 110 by using an appropriate electromagnetic beam that would erase the content of a dedicated register of the PSRC 102.

Once the RFID wireless communication is established between the PSRC 102 and the distant equipment 104, the data transfer is initiated from either the PSRC 102 to the distant equipment 104, or from the distant equipment 104 to the PSRC 102.

For each data transmission, the data packets related to the wireless message of the user 117 are encrypted by using a protected key that is hard coded in the memory (not shown in FIG. 2). This key is provided to the distant equipment 104 at the leading data message transfer to protect the global transmission allowing the entire transmission to be locked between the PSRC 102 and the distant equipment 104 until transfer completion. Transfer completion is indicated to the distant equipment 104 via a dedicated operating code that is stored in the memory 224.

This feature allows the wireless communication to be initiated as a robust and secure safeguard protocol, keeping a data coherency of the wireless message all along the transfer.

Figure 3:
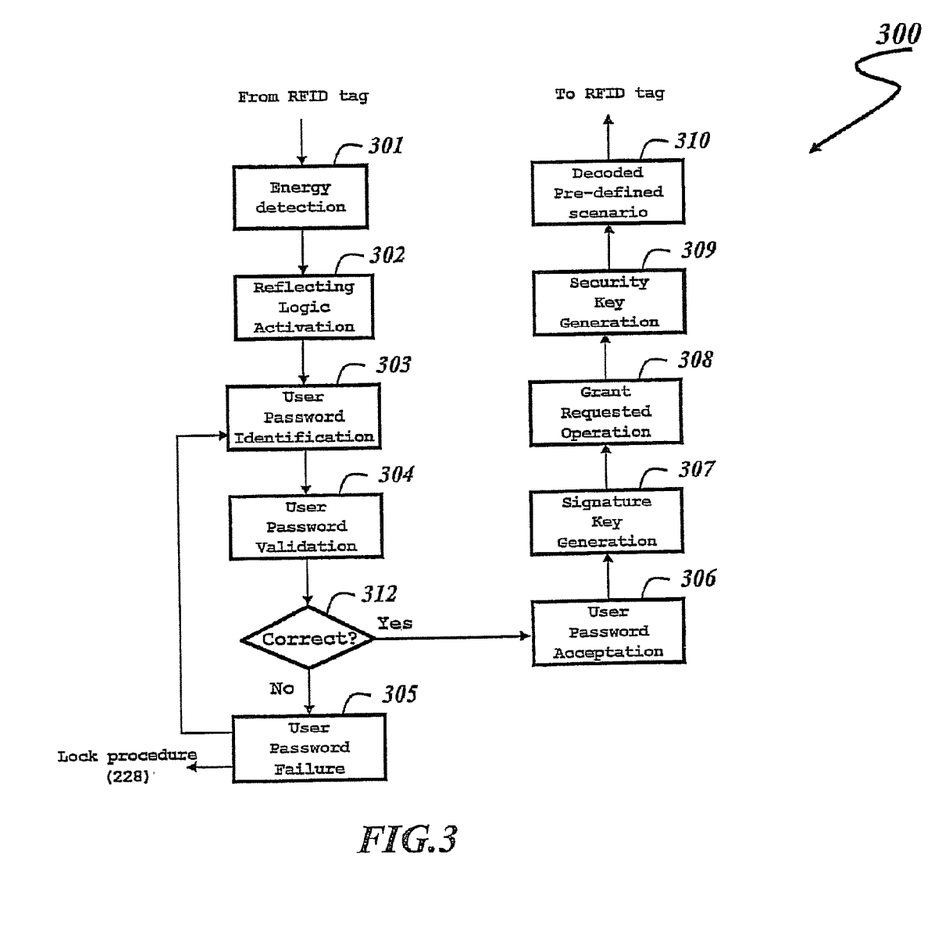
FIG. 3. is a flow chart depicting operation for a data transfer between the PSRC and the distant equipment of FIG. 1, in accordance with embodiments of the present invention.

FIG. 3 is a flow chart of the operation for a data transfer between the PSRC 102 and the distant equipment 104 of FIG.

1, in accordance with embodiments of the present invention. The flow chart of FIG. 3 comprises steps 301-310.

Step 301 detects an energy flow. During the energy detection, the passive RFID tag 102 permanently receives the energy contained in the electromagnetic beam transmitted from the distant equipment 104. The detection of this energy initiates a reflecting logic activation phase in step 302.

In step 302, the power transmitted from the distant equipment 104 energizes the reflecting logic block 112. This reflecting logic block 112 is powered on and initiates a user password identification phase in step 303.

In step 303, the user password identification phase checks that the user's password of the user 117 is correct before granting the requested operation 202. The user's password is entered by the user 117 using the matrix buttons 118, and the password checking procedure is initiated via the user password validation phase in step 304.

In step 304, the user's password is checked and validated and the user 117 is identified in order to authorize the requested operation 202 to start the data transmission. The user's password is compared in step 312 to a password table that was preliminarily defined by the PSRC 102 owner during the PSRC configuration phase. The way the password table is coded and how the PSRC configuration phase is established are not described herein, as being normal configuration operations for remote controllers. If the password is not correct, the user password failure phase is initiated in step 305.

In step 305, the failure password code is activated and leads the PSRC 102 to be locked until a password reset is applied. The requested operation 202 then fails and the PSRC 102 is locked via lock procedure 228. After step 305 is performed, the process loops back to step 303.

If the password is correct in step 312, then the user password is accepted in step 306. The system 100 identifies the user 117 as an authorized person to operate the PSRC 102 and thus the necessary access is given to run the desired requested operation 202.

After step 306 is performed, step 307 combines the user's password with the Electronic Product Code (EPC) to create a resultant polynomial that is used to generate a signature key based on a Cyclic Redundancy Checks (CRC) logic.

Next, in step 308, the requested operation 202 is granted for controlling the device or remote equipment 104, which allows the data transmission to start.

In step 309, a security key is generated to allow the corresponding encrypted predefined scenario to be decrypted in step 310. The security key is generated by any well-known key generator. The security key is a polynomial formula that allows the encrypted predefined scenarios 116 to be decrypted throughout the current data transfer. Both the PSRC 102 and the distant equipment 104 are locked together until the current data transfer is completed thereby avoiding any undesirable parasitic communication issued from another system.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

For example, the present remote controller can offer various features to be used in a card service implementation, like a portable digital code that allows removing the apparent device near to the door, which can be vandalized or used by hackers. The activation of the card can be customized by using a personal password that is different for each other's password, allowing setting different codes to different people as well as setting different codes for different doors.

What is claimed is:

1. A method for controlling distant equipment, said method comprising:
   receiving, by a passive radio frequency identification (RFID) tag comprised by a Programmable Secure Remote Controller (PSRC), radio frequency (RF) signals from a transmitter integrated in the distant equipment, said distant equipment being external to and remote from the PSRC, said PRSC not comprising an internal source of energy and requiring energy from a source external to the PSRC in order to operate, said PSRC configured to distribute sufficient energy from the RF signals to components of the PSRC to enable the components to operate, said components comprising the RFID tag;
   responsive to said receiving the RF signal, activating the RFID tag to generate information indicative of the distant equipment;
   decoding the information generated by the RFID tag, said decoding the information identifying the distant equipment;
   receiving a request to perform an operation that controls the distant equipment;
   after said receiving the request, activating a first predefined scenario for performing the operation that controls the distant equipment, wherein said activating the RFID tag, said decoding the information, said receiving the request, and said activating the first predefined scenario are performed by the PSRC, wherein the PSRC comprises a memory in which a plurality of predefined scenarios are stored, wherein each predefined scenario specifies how the distant equipment is to be controlled; and
   before said activating the first predefined scenario, receiving a selection by a user of the first predefined scenario from the plurality of predefined scenarios stored in the memory, wherein said receiving the selection of the first predefined scenario is performed by the PSRC,
   wherein the method further comprises:
      receiving a user password inputted to the PSRC by the user;
      validating the user password;
      combining the validated user password with the tag identification to create a resultant polynomial;
      generating a signature key based on a Cyclic Redundancy Check (CRC) signature key logic, wherein said generating the signature key comprises using the resultant polynomial, and wherein the signature key facilitates operation by the PSRC in a flexible secure protocol; and
      after said generating the signature key, granting the request to perform the operation that controls the distant equipment, wherein said receiving the user password, said validating the user password, said combining, and said generating the signature key, said granting the request are performed by the PSRC.

2. The method of claim 1, wherein the predefined scenarios of the plurality of predefined scenarios are stored in the memory as encrypted predefined scenarios, wherein a plurality of decryption algorithms are stored in the memory for decrypting the encrypted predefined scenarios, and wherein the method further comprises:
   after said receiving the selection of the first predefined scenario, retrieving the encrypted first predefined scenario from the memory; and before said activating the first predefined scenario, decrypting the retrieved encrypted first predefined scenario through use of a decryption algorithm of the plurality of decryption algorithms, wherein said retrieving and said decrypting are performed by the PSRC.

3. The method of claim 1, wherein the PSRC comprises a sensitive board on which matrix buttons are located, wherein a sequence of at least one button of the matrix of buttons is associated with the first predefined scenario, and wherein said receiving the selection by the user of the first predefined scenario comprises detecting a striking of the sequence of at least one button by the user.

4. The method of claim 1, wherein the method further comprises encrypting the plurality of predefined scenarios into the memory during a chip design configuration phase of the PSRC.

5. The method of claim 1, wherein the method further comprises receiving, by the PSRC, an electromagnetic beam that causes massive destruction of the PSRC by erasing content of a dedicated register of the PSRC.

6. A program storage device readable by machine, said program storage device tangibly storing a program of instructions executable by the machine to perform a method for controlling distant equipment, said machine being a Programmable Secure Remote Controller (PSRC), said method comprising:
receiving, by a passive radio frequency identification (RFID) tag comprised by the PSRC, radio frequency (RF) signals from a transmitter integrated in the distant equipment, said distant equipment being external to and remote from the PSRC, said PRSC not comprising an internal source of energy and requiring energy from a source external to the PSRC in order to operate, said PSRC configured to distribute sufficient energy from the RF signals to components of the PSRC to enable the components to operate, said components comprising the RFID tag;
responsive to said receiving the RF signal, activating the RFID tag to generate information indicative of the distant equipment;
decoding the information generated by the RFID tag, said decoding the information identifying the distant equipment;
receiving a request to perform an operation that controls the distant equipment;
after said receiving the request, activating a first predefined scenario for performing the operation that controls the distant equipment, wherein said activating the RFID tag, said decoding the information, said receiving the request, and said activating the first predefined scenario are performed by the PSRC, wherein the PSRC comprises a memory in which a plurality of predefined scenarios are stored, wherein each predefined scenario specifies how the distant equipment is to be controlled; and
before said activating the first predefined scenario, receiving a selection by a user of the first predefined scenario from the plurality of predefined scenarios stored in the memory, wherein said receiving the selection of the first predefined scenario is performed by the PSRC,
wherein the method further comprises:
receiving a user password inputted to the PSRC by the user;
validating the user password;
combining the validated user password with the tag identification to create a resultant polynomial;
generating a signature key based on a Cyclic Redundancy Check (CRC) signature key logic, wherein said generating the signature key comprises using the resultant polynomial, and wherein the signature key facilitates operation by the PSRC in a flexible secure protocol; and
after said generating the signature key, granting the request to perform the operation that controls the distant equipment, wherein said receiving the user password, said validating the user password, said combining, and said generating the signature key, said granting the request are performed by the PSRC.

7. The program storage device of claim 6, wherein the predefined scenarios of the plurality of predefined scenarios are stored in the memory as encrypted predefined scenarios, wherein a plurality of decryption algorithms are stored in the memory for decrypting the encrypted predefined scenarios, and wherein the method further comprises:
after said receiving the selection of the first predefined scenario, retrieving the encrypted first predefined scenario from the memory; and
before said activating the first predefined scenario, decrypting the retrieved encrypted first predefined scenario through use of a decryption algorithm of the plurality of decryption algorithms, wherein said retrieving and said decrypting are performed by the PSRC.

8. The program storage device of claim 6, wherein the PSRC comprises a sensitive board on which matrix buttons are located, wherein a sequence of at least one button of the matrix of buttons is associated with the first predefined scenario, and wherein said receiving the selection by the user of the first predefined scenario comprises detecting a striking of the sequence of at least one button by the user.

9. The program storage device of claim 6, wherein the method further comprises encrypting the plurality of predefined scenarios into the memory during a chip design configuration phase of the PSRC.

10. The program storage device of claim 6, wherein the method further comprises receiving, by the PSRC, an electromagnetic beam that causes massive destruction of the PSRC by erasing content of a dedicated register of the PSRC.

11. A system comprising a Programmable Secure Remote Controller (PSRC), said PSRC comprising a program storage device tangibly storing a program of instructions executable by the PSRC to perform a method for controlling distant equipment , said method comprising:
receiving, by a passive radio frequency identification (RFID) tag comprised by the PSRC, radio frequency (RF) signals from a transmitter integrated in the distant equipment, said distant equipment being external to and remote from the PSRC, said PRSC not comprising an internal source of energy and requiring energy from a source external to the PSRC in order to operate, said PSRC configured to distribute sufficient energy from the RF signals to components of the PSRC to enable the components to operate, said components comprising the RFID tag;
responsive to said receiving the RF signal, activating the RFID tag to generate information indicative of the distant equipment;
decoding the information generated by the RFID tag, said decoding the information identifying the distant equipment;
receiving a request to perform an operation that controls the distant equipment;
after said receiving the request, activating a first predefined scenario for performing the operation that controls the distant equipment, wherein said activating the RFID tag, said decoding the information, said receiving the request, and said activating the first predefined scenario are performed by the PSRC, wherein the PSRC comprises a memory in which a plurality of predefined scenarios are stored, wherein each predefined scenario specifies how the distant equipment is to be controlled; and before said activating the first predefined scenario, receiving a selection by a user of the first predefined scenario from the plurality of predefined scenarios stored in the memory, wherein said receiving the selection of the first predefined scenario is performed by the PSRC, wherein the method further comprises:
    receiving a user password inputted to the PSRC by the user;
    validating the user password;
    combining the validated user password with the tag identification to create a resultant polynomial;
    generating a signature key based on a Cyclic Redundancy Check (CRC) signature key logic, wherein said generating the signature key comprises using the resultant polynomial, and wherein the signature key facilitates operation by the PSRC in a flexible secure protocol; and
    after said generating the signature key, granting the request to perform the operation that controls the distant equipment, wherein said receiving the user password, said validating the user password, said combining, and said generating the signature key, said granting the request are performed by the PSRC.

12. The system of claim 11, wherein the predefined scenarios of the plurality of predefined scenarios are stored in the memory as encrypted predefined scenarios, wherein a plurality of decryption algorithms are stored in the memory for decrypting the encrypted predefined scenarios, and wherein the method further comprises:
    after said receiving the selection of the first predefined scenario, retrieving the encrypted first predefined scenario from the memory; and
    before said activating the first predefined scenario, decrypting the retrieved encrypted first predefined scenario through use of a decryption algorithm of the plurality of decryption algorithms, wherein said retrieving and said decrypting are performed by the PSRC.

13. The system of claim 11, wherein the PSRC comprises a sensitive board on which matrix buttons are located, wherein a sequence of at least one button of the matrix of buttons is associated with the first predefined scenario, and wherein said receiving the selection by the user of the first predefined scenario comprises detecting a striking of the sequence of at least one button by the user.

14. The system of claim 11, wherein the method further comprises encrypting the plurality of predefined scenarios into the memory during a chip design configuration phase of the PSRC.

\* \* \* \* \*